United States Patent
Lopatin et al.

(10) Patent No.: US 6,236,322 B1
(45) Date of Patent: May 22, 2001

(54) APPARATUS FOR ESTABLISHING AND/OR MONITORING A PREDETERMINED FILLING LEVEL IN A CONTAINER

(75) Inventors: Sergej Lopatin, Lörrach; Helmut Pfeiffer; Alexander Müller, both of Steinen; Volker Dreyer, Lörrach; Wolfgang Brutschin, Schopfheim, all of (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 09/388,299

(22) Filed: Sep. 1, 1999

Related U.S. Application Data
(60) Provisional application No. 60/107,158, filed on Nov. 5, 1998.

(30) Foreign Application Priority Data

Sep. 9, 1998 (EP) ............................................. 98 11 7077

(51) Int. Cl.[7] .................................................. G08B 21/00
(52) U.S. Cl. ........................ 340/612; 340/620; 340/621; 73/290 V
(58) Field of Search ................... 340/612, 621, 340/620, 691.1; 73/290 V

(56) References Cited

U.S. PATENT DOCUMENTS

| | | |
|---|---|---|
| 3,339,400 | 9/1967 | Banks .................................. 73/32 A |
| 3,385,104 | 5/1968 | Banks .................................... 73/580 |
| 5,631,633 | 5/1997 | Dreyer et al. .......................... 340/621 |
| 5,969,621 * | 10/1999 | Getman et al. ....................... 340/621 |
| 6,148,665 * | 11/2000 | Getman et al. ....................... 340/621 |

FOREIGN PATENT DOCUMENTS

| | | |
|---|---|---|
| 1 512 233 | 5/1978 | (GB) . |
| 2 054 853 | 2/1981 | (GB) . |
| 2 185 575 | 7/1987 | (GB) . |

* cited by examiner

Primary Examiner—Daniel J. Wu
(74) Attorney, Agent, or Firm—Bose McKinney & Evans LLP

(57) ABSTRACT

An apparatus for establishing and/or monitoring a predetermined filling level in a container is described, which apparatus can be used in a wide range of applications, that is to say in many different media, which apparatus comprises: a housing (1), an oscillating element for projecting into the container, a diaphragm (5), which is fixedly clamped into the housing (1) at its edge and to which the oscillating element is fastened, and an electromechanical transducer for exciting the diaphragm (5) to produce oscillations in dependence on a transmission signal (S) present at the transducer and for receiving and converting oscillations thereof into an electrical reception signal (E), in which a percentage interval between a resonant frequency $f_r$ and an antiresonant frequency $f_{ar}$ divided by the resonant frequency $f_r$ exceeds 20% when the oscillating element oscillates in air.

14 Claims, 9 Drawing Sheets

APPARATUS FOR ESTABLISHING AND/OR MONITORING A PREDETERMINED FILLING LEVEL IN A CONTAINER

This application claims benefit of Provisional Application No. 60/107,158 filed Nov. 5, 1998.

BACKGROUND OF THE INVENTION

The invention relates to an apparatus for establishing and/or monitoring a predetermined filling level in a container.

The prior art describes apparatus having an oscillating element which is fastened to a diaphragm and projects into the container. One, two or more oscillating bars fastened to the diaphragm can be used, for example, as the oscillating element. The diaphragm is caused to oscillate by means of an electromechanical transducer and the resulting oscillations are picked up and converted into an electrical reception signal. The oscillation of the diaphragm causes the oscillating element to oscillate. If, in operation, the oscillating element is covered by a charge material arranged in the container then its oscillation is attenuated. The oscillation frequency of the apparatus and the oscillation amplitude of the oscillating element change. An electrical reception signal is fed to an electronic evaluation unit and evaluated. A reduction in the oscillation frequency and/or in the oscillation amplitude below a fixed reference value is identified by an electronic evaluation unit connected downstream and is indicated and/or used to initiate a switching operation.

Apparatus of this type are employed in many industries. They are employed, for example, as filling level limit detectors in the chemical industry, in the foodstuffs industry or in the field of water treatment. In these cases, they may serve, for example, as a protection against overfilling or as a safeguard against pumps running dry. The variety of charge materials into which such an apparatus can be immersed during operation ranges from water through yogurt, colorants and coatings to highly viscous charge materials such as honey or greatly foaming charge materials such as beer, for example.

DE-A 44 19 617 describes an apparatus for establishing and/or monitoring a predetermined filling level in a container, which apparatus comprises:

a housing, two oscillating bars projecting into the container, a diaphragm which is fixedly clamped into the housing at its edge and
  to which the oscillating bars are fastened in a manner spaced apart from one another, a piezoelectric excitation transducer arranged on the diaphragm and serving to excite the diaphragm to produce oscillations, and a piezoelectric reception transducer arranged on the diaphragm and serving to receive and convert oscillations thereof into an electrical reception signal, the oscillations of the diaphragm causing the oscillating bars to oscillate in opposite directions transversely with respect to their longitudinal axis.

In this apparatus, a feedback circuit is provided which has an input amplifier, a phase shifter connected in series with the input amplifier and an output amplifier connected in series with the phase shifter. During operation, a reception signal recorded by the reception transducer is applied to the input of the feedback circuit and an output signal of this feedback circuit is applied to the excitation transducer.

This apparatus is a complex oscillatory system composed of a mechanical oscillatory structure, an electromechanical transducer and the feedback circuit. The individual components are not completely isolated electrically and separated mechanically from one another. Both electrical and mechanical coupling occur.

Consequently, the reception signal comprises not only the desired measurement signal, which is ascribed to the oscillation of the respective mechanical oscillatory structure, but also additional signals produced by the aforementioned coupling.

To date, it has not been possible to employ apparatus of this type for measurements in both highly viscous media and in hydrous or viscous foams. When the presettings that were implemented were chosen such that the apparatus operated entirely satisfactorily in one of these applications, problems arose in the other application for example such that reliable excitation of the mechanical oscillatory structure to produce oscillations could not be ensured in one of the applications.

The phase difference generated by the phase shifter corresponds for example to the resonance of the system when the oscillatory structure oscillates in air. However, if the oscillation quality of the system is reduced for any reason, then the consequence of this is that this fixed value of the phase difference no longer exists. There is no frequency at which the mechanical oscillatory structure oscillates having an amplitude different from zero and having a phase difference that is the fixed value. This phase difference cannot be set by the feedback circuit. Incorrect functioning consequently occurs.

A reduction in the oscillation quality occurs, for example, when the movement of the mechanical oscillatory structure is attenuated, for example by the latter being immersed in a viscous medium or in a liquid-containing or viscous foam.

European patent application No. 97107152.7 describes an apparatus for establishing and/or monitoring a predetermined filling level in a container, which apparatus comprises:

a housing, two oscillating bars projecting into the container, a diaphragm which is fixedly clamped into the housing at its edge and,
  to which the oscillating bars are fastened in a manner spaced apart from one another, a single disk-type piezoelectric element arranged on the diaphragm and serving to excite the diaphragm to produce oscillations and serving to receive and convert oscillations thereof into an electrical reception signal,
  on which element two electrodes of identical form are arranged symmetrically with respect to an axis lying in a diaphragm plane, the oscillations of the diaphragm causing the oscillating bars to oscillate in opposite directions transversely with respect to their longitudinal axis.

The two electrodes of identical form are a first and a second receiver. A further electrode, which serves as a transmitter, is arranged between the first and second receivers. The piezoelectric element has three zones respectively covered by one of the three electrodes. A first zone covered by the first receiver has a polarization direction which runs parallel to a normal to the surface of the piezoelectric element; the other two zones have a polarization direction opposite to the polarization direction of the first zone. In order to excite the apparatus to produce oscillations in the event of resonance thereof, a difference between a signal recorded by the first receiver and a signal recorded by the second receiver is formed, a signal corresponding to the difference is formed and is phase-shifted by a constant, sensor-specific absolute value, and the phase-shifted signal is applied to the transmitter. On account of the different polarization directions of the individual zones, it is a matter of critical importance which signal is subtracted from which. Inadvertent interchanging of the electrical connections of the first and second receivers leads to a non-functional apparatus. Great care must be exercised during the production of such an apparatus. Expensive piezoelectric elements have to be used on account of the zones having different polarization directions. It is necessary to distinguish between the zones of different polarization during the production process and it is necessary to distinguish between the two receivers of identical form and to correctly connect them. This means a high additional outlay of resources and contains sources of error.

SUMMARY OF THE INVENTION

An object of the invention is to specify an apparatus for establishing and/or monitoring a predetermined filling level in a container, which apparatus can be employed in a wide range of applications, that is to say in many different media.

As a result of the large range of applications stipulated by the object, it is possible to sell the apparatus in large numbers. To that end, it is particularly advantageous if the apparatus is constructed in a simple manner and can be produced with little outlay of resources.

This object is achieved by means of an apparatus for establishing and/or monitoring a predetermined filling level in a container, which apparatus comprises:

a housing, an oscillating element projecting into the container, a diaphragm, which is fixedly clamped into the housing at its edge and to which the oscillating element is fastened, and an electromechanical transducer for exciting the diaphragm to produce oscillations in dependence on a transmission signal present at the transducer and for receiving and converting oscillations thereof into an electrical reception signal, in which a percentage interval between a resonant frequency and an antiresonant frequency referring to the resonant frequency exceeds 20% when the oscillating element oscillates in air.

In accordance with the present invention, the electromechanical transducer is a single homogeneously polarized, disk-type piezoelectric element, which is arranged on the diaphragm and on which two electrodes of identical form are arranged symmetrically with respect to an axis lying in a diaphragm plane, one of which electrodes serves as transmitter and one as receiver.

In accordance with a refinement, a disk is arranged between the diaphragm and the piezoelectric element which disk is made of a material having a mechanical stiffness which is approximately equal to the stiffness of the piezoelectric element.

In accordance with a further refinement, a disk made of steatite is arranged between the diaphragm and the piezoelectric element.

In accordance with the present invention, a ground electrode is arranged on that side of the piezoelectric element which faces the diaphragm, which ground electrode is electrically conductively connected to a connection electrode arranged on the side which faces away from the diaphragm, which connection electrode is symmetrical with respect to the axis lying in the diaphragm plane.

In accordance with a refinement, the electrodes are electrically conductively connected to cores of a flexible printed circuit board.

In accordance with a refinement, multilayer varistors are arranged on the flexible printed circuit board, said varistors serving for voltage limiting and being soldered on by means of surface mounting.

In accordance with the present invention, the oscillating element has two oscillating bars, which are fastened in a manner spaced apart from one another on the diaphragm and are caused to oscillate, by the oscillations of the diaphragm, in opposite directions transversely with respect to their longitudinal axis, and a straight line running in the diaphragm plane and connecting the oscillating bars runs perpendicular to the axis. The electrodes are arranged symmetrically on the diaphragm with respect to the straight line.

In accordance with the present invention, a mounting sleeve is arranged in the housing, which sleeve has a first opening, which faces the diaphragm and is closed off by the piezoelectric element, and which sleeve has a second opening which faces away from the diaphragm and through which the flexible printed circuit board is passed.

In accordance with a refinement, a fixing apparatus for fixing the flexible printed circuit board is provided on the mounting sleeve.

In accordance with a further refinement, a plug is arranged on those sides of the mounting sleeve and fixing apparatus which face away from the diaphragm, in the housing, to which plug the cores of the flexible printed circuit board are electrically conductively connected and which plug has plug contacts via which contact can be made with the cores.

In accordance with the present invention, a feedback circuit is provided, at whose input, during operation, a reception signal picked up by the electromechanical transducer is present, at whose output, during operation, a transmission signal is available. The transmission signal is equal to the reception signal, is shifted by a sensor-specific phase and is applied to the electro mechanical transducer during operation. The sensor-specific phase shift generated being virtually identical for input signals whose frequencies lie within a frequency range, and the frequency range being given by the frequencies of the apparatus when immersed in various media.

In accordance with the present invention, the sensor-specific phase shift is equal to a phase difference at which curves recorded with the apparatus intersect, which curves show the profile of a phase difference between the transmission signal and the reception signal as a function of the frequency of the transmission signal for oscillating elements immersed in various media.

The fact that the percentage interval between the resonant frequency $f_r$ and the antiresonant frequency $f_{ar}$ referring to the resonant frequency $f_r$ is greater than 20% ensures that the apparatus can be employed in a wide range of applications. As is explained in more detail below, the apparatus can be employed in very many different media, starting with water through to highly viscous media, such as honey, or very viscous foams, without changes to the setting being necessary.

BRIEF DESCRIPTION OF THE DRAWINGS

The invention and further advantages will now be explained in more detail with reference to the figures of the drawing, which illustrate an exemplary embodiment; identical elements are provided with the same reference symbols in the figures.

DETAILED DESCRIPTION OF PREFERRED EMBODIMENTS

Figure 1:
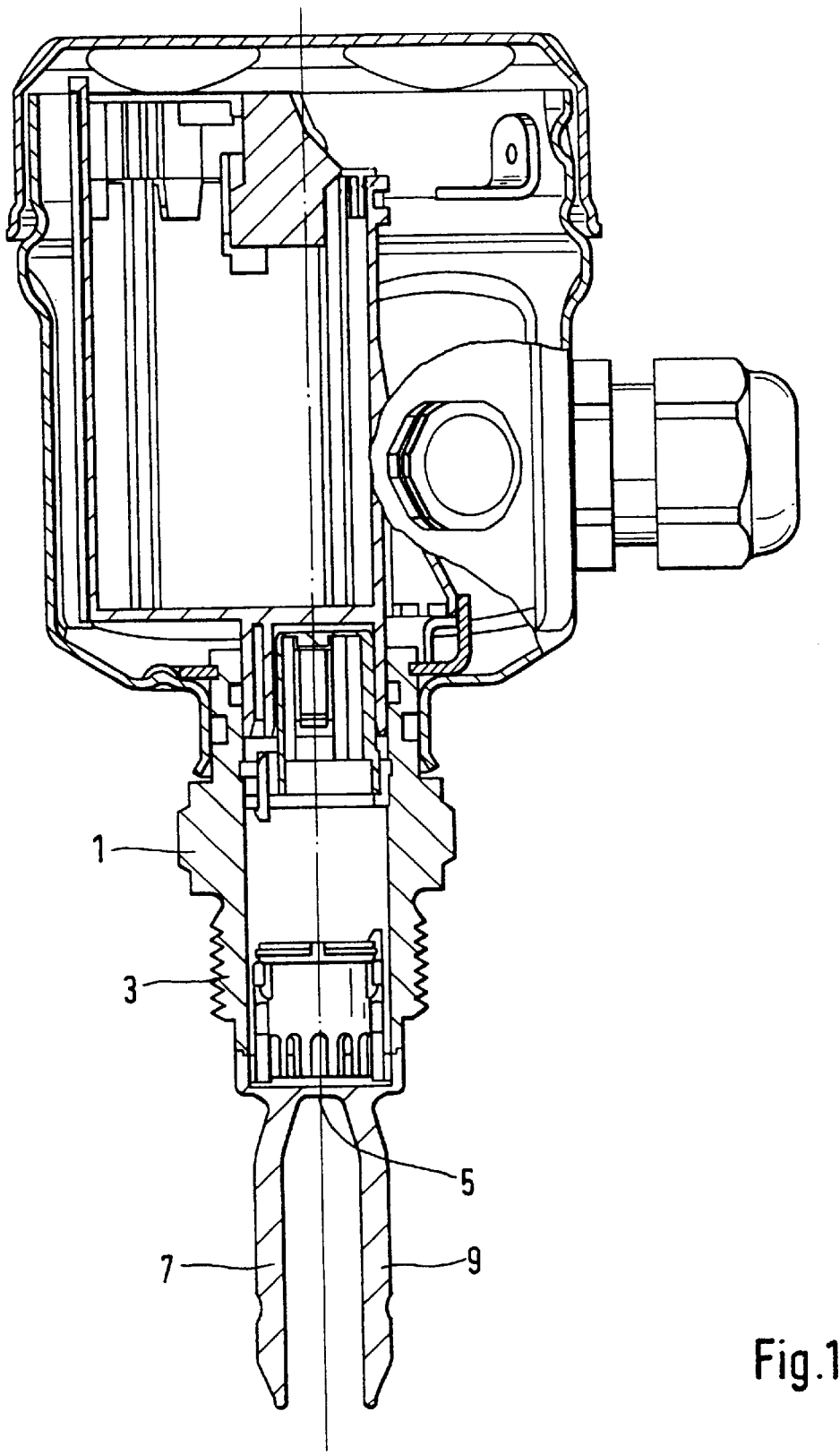
FIG. 1 shows a longitudinal section through an apparatus according to the invention.

FIG. 1 illustrates an exemplary embodiment of an inventive apparatus for establishing and/or monitoring a predetermined filling level in a container.

The apparatus has a cylindrical housing 1, on the outer cylindrical lateral surface of which a thread 3 is provided, by means of which thread the apparatus can be screwed into an opening arranged at the height of the predetermined filling level in a container which is not illustrated in FIG. 1. Other types of fastening, for example by means of a flange, can likewise be used.

At its end pointing into the container, the housing 1 is closed off by a diaphragm 5, which is fixedly clamped into the housing 1 at its edge. An oscillating element projecting into the container is fastened to the diaphragm 5. In the exemplary embodiment shown, this comprises two oscillating bars 7, 9, which are fastened such that they are spaced apart from one another on the diaphragm 5 and project into the container.

Figure 2:
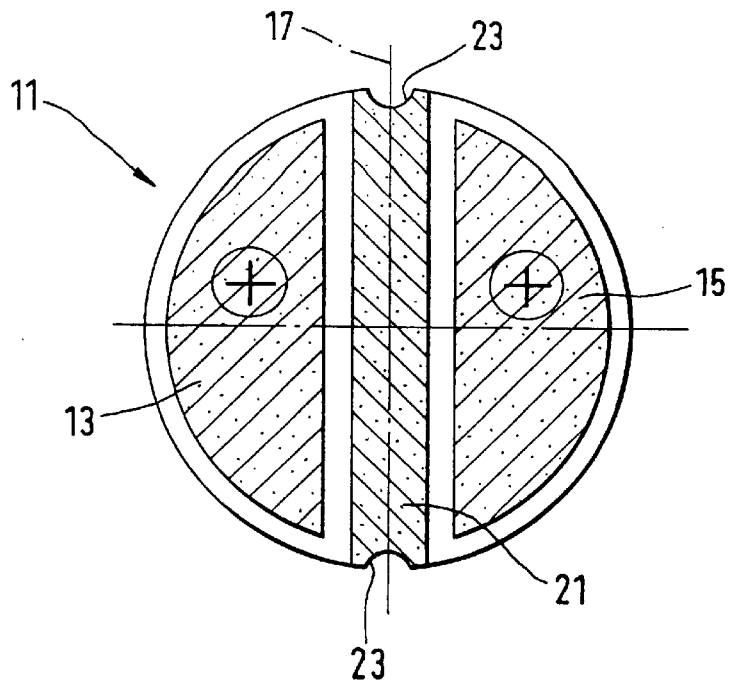
FIG. 2 shows a plan view of that side of the piezoelectric element of FIG. 1 which faces away from the diaphragm.
Figure 3:
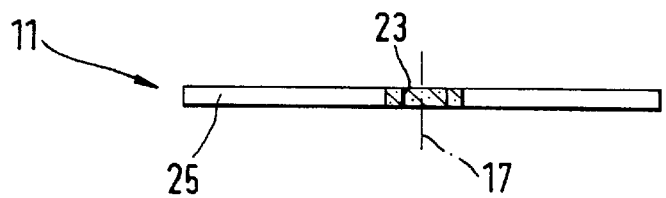
FIG. 3 shows a view of the cylindrical lateral surface of the piezoelectric element of FIG. 1.
Figure 4:
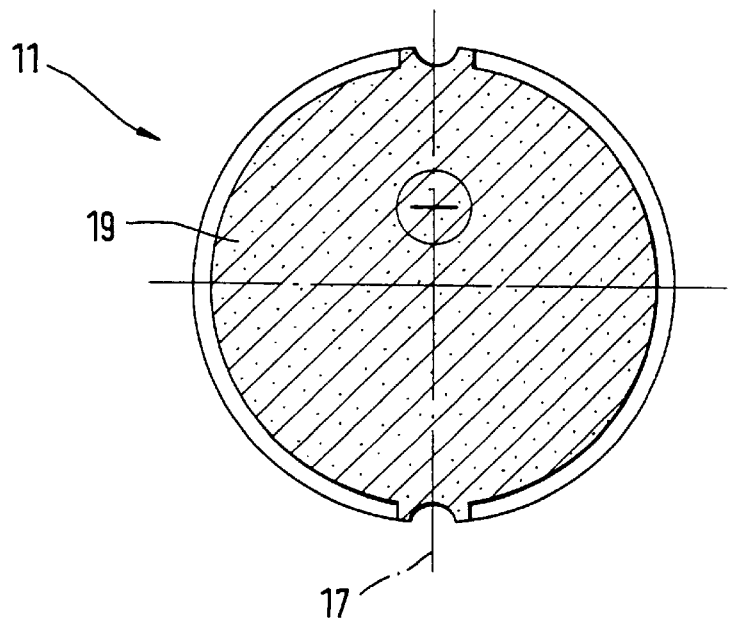
FIG. 4 shows a plan view of that side of the piezoelectric element of FIG. 1 that faces the diaphragm.

An electromechanical transducer is arranged on the diaphragm 5. In the exemplary embodiment shown, this is a single piezoelectric element 11. FIG. 2 shows a plan view of that side of the piezoelectric element 11 which faces away from the diaphragm 5; FIG. 3 shows a view of the cylindrical lateral surface of said piezoelectric element; and FIG. 4 shows a plan view of that side of said piezoelectric element which faces the diaphragm.

The piezoelectric element 11 serves to excite the diaphragm 5 to produce oscillations in dependence on a transmission signal S applied to the piezoelectric element 11, and to receive and convert the oscillations of said diaphragm into an electrical reception signal E.

The piezoelectric element 11 is in the form of a disk and has homogeneous polarization. The polarization direction is parallel to the normal to the surface of the diaphragm 11.

Taken by itself, the piezoelectric element 11 changes its thickness in dependence on a voltage difference that is present in the polarization direction. If an AC voltage is applied, then the thickness oscillates. If the thickness increases, then the diameter of the piezoelectric element 11 decreases; if the thickness decreases, then the diameter is enlarged correspondingly.

On account of this oscillatory response of the piezoelectric element 11, a voltage difference causes flexure of the diaphragm 5 in the state of having been fitted into the apparatus.

If a voltage difference is present which causes an enlarged diameter in the case of the piezoelectric element 11, taken by itself, then the center of flexure, that is to say at least one point of intersection of lines perpendicular to the fastening surface, lies on that side of the piezoelectric element 11 which faces the diaphragm. If a voltage difference is present which causes a reduced diameter in the case of the piezoelectric element 11, taken by itself, then the center of flexure lies on that side of said piezoelectric element which faces away from the diaphragm.

If an AC voltage is applied to the piezoelectric element 11, then the diaphragm 5 executes oscillations whose antinode is situated in the center thereof.

On account of the oscillations of the diaphragm 5, the oscillating bars 7, 9 arranged on the diaphragm 5 execute oscillations in opposite directions transversely with respect to the longitudinal axis thereof. The displacement of the oscillating bars 7, 9 is indicated by arrows in FIG. 1. On account of this oscillating in opposite directions, the alternating forces exerted on the diaphragm 5 by each oscillating bar 7, 9 cancel one another out. As a result, the mechanical stressing of the clamp is low, and no oscillation energy is transmitted to the housing 1.

Two electrodes of identical form are arranged on the piezoelectric element 11. One of the electrodes serves as transmitter 13. The diaphragm 5 is caused to oscillate by an AC voltage applied to the transmitter 13. The other electrode serves as receiver 15. An oscillation of the diaphragm 5 generates a reception signal E that can be picked off via the receiver 15.

The transmitter 13 and receiver 15 are arranged symmetrically with respect to an axis 17 lying in the diaphragm plane. The axis 17 corresponds to a diagonal of the circular area of the piezoelectric element 11.

A ground electrode 19, which is illustrated in FIG. 4, is arranged on that side of the piezoelectric element 11 which faces the diaphragm.

If the housing 1 and the diaphragm 5 are composed of an electrically conductive material and are electrically conductively connected to ground potential, it suffices to bond the piezoelectric element 11 onto the diaphragm 5 using a conductive adhesive or to solder it onto the diaphragm 5. Thus, the electrical connection of the ground electrode 19 and the mechanical connection between diaphragm 5 and piezoelectric element 11, said mechanical connection serving to excite oscillations, are established simultaneously.

However, if the housing 1 is composed of a nonconductive material, for example of a plastic, or if there is to be no conductive connection between the piezoelectric element 11 and the diaphragm 5 or the housing 1, for safety reasons, then the connection of the ground electrode 19 must be effected in a different manner. Different regulations apply depending on the field of use and country of use of the apparatus. A requirement that is frequently made in many countries and for many application fields is that which stipulates the necessity of direct electrical isolation between the electronics of the apparatus, including the electrical connection of the piezoelectric element 11, and the housing 1.

If an electrically conductive connection between the housing 1 or the diaphragm 5 and the piezoelectric element 11 is not permitted, for safety reasons, then a disk 31 made of an insulator must be inserted between the diaphragm 5 and piezoelectric element 11. Such a disk 31 is shown in the exploded illustration of FIG. 5. In principle, it is possible to use a multiplicity of different insulating materials. However, investigations have shown that particularly good oscillation transmission properties, in particular low power losses, are obtained if a material is used whose mechanical stiffness is approximately the same as the mechanical stiffness of the piezoelectric element 11. The variables that correlate with one another, modulus of elasticity, bulk modulus, flexural strength and compressive and tensile strength, are each a measure of the stiffness of a material. If the stiffness of the disk 31 is less than that of the piezoelectric element 11, then part of the energy available for exciting oscillations is lost, since the disk 31 is deformed by the stiffer piezoelectric element 11. If the stiffness of the disk 31 is greater than that of the piezoelectric element 11, then the disk 31 prevents the oscillation of the piezoelectric element 11 and oscillation energy is likewise lost.

Particularly good results have been obtained with a disk 31 made of steatite. Steatite is a material which is obtained from a paste made of talc and water by means of pressing and sintering. With regard to the energy balance, good results can also be achieved with porcelains based on silicon oxide. On account of their stiffness, 30% to 50% glass fiber-reinforced plastics, such as, for example, polyether ether ketone (PEEK) or polyetherimide (PEI), can likewise be used. However, these materials can only be used at temperatures below the glass transition temperature of the respective glass fiber-reinforced plastic, as a result of which the range of applications in which the apparatus can be employed is limited. Aluminum oxide ceramics, on the other hand, are less well suited, as a rule, since thicker piezoelectric elements have to be used in conjunction with aluminum oxide ceramics. Thicker piezoelectric elements have smaller capacitances, which is in turn disadvantageous for the downstream electronics.

This can be illustrated by way of example by a comparison of the moduli of elasticity. A piezoelectric element 11 made of lead zirconium titanate (PZT ceramic) typically has a modulus of elasticity of approximately $140 \times 10^3$ N/mm$^2$. Steatite has a modulus of elasticity of approximately $100 \times 10^3$ N/mm$^2$. By contrast, aluminum oxide ceramics have moduli of elasticity of up to $300 \times 10^3$ N/mm$^2$.

According to the invention, the ground electrode 19 is conductively connected to a connection electrode 21 arranged on the side facing away from the diaphragm. This is preferably achieved in that the conductive layer which forms the ground electrode 19 extends, at least at one location 23, across a cylindrical lateral surface 25 of the piezoelectric element 11 to the opposite side of the diaphragm, where it merges with the connection electrode 21. In the exemplary embodiment illustrated in FIG. 2, two mutually diametrically opposed locations 23 are provided. The connection electrode 21 is symmetrical with respect to the axis 17 lying in the diaphragm plane and is situated between the transmitter 13 and the receiver 15. It has the form of a widened diagonal.

The effect achieved by this arrangement is that the ground electrode 19 can be electrically connected via the connection electrode 21 on that side of the piezoelectric element 11 which faces away from the diaphragm. This affords considerable advantages during the production of apparatus according to the invention. Since the electrical connection of all three electrodes is in each case effected on the same side of the piezoelectric element 11, large series can be arranged in batches on corresponding carriers and be processed simultaneously. It is not necessary to rotate or remove the piezoelectric elements 11.

Figure 6:
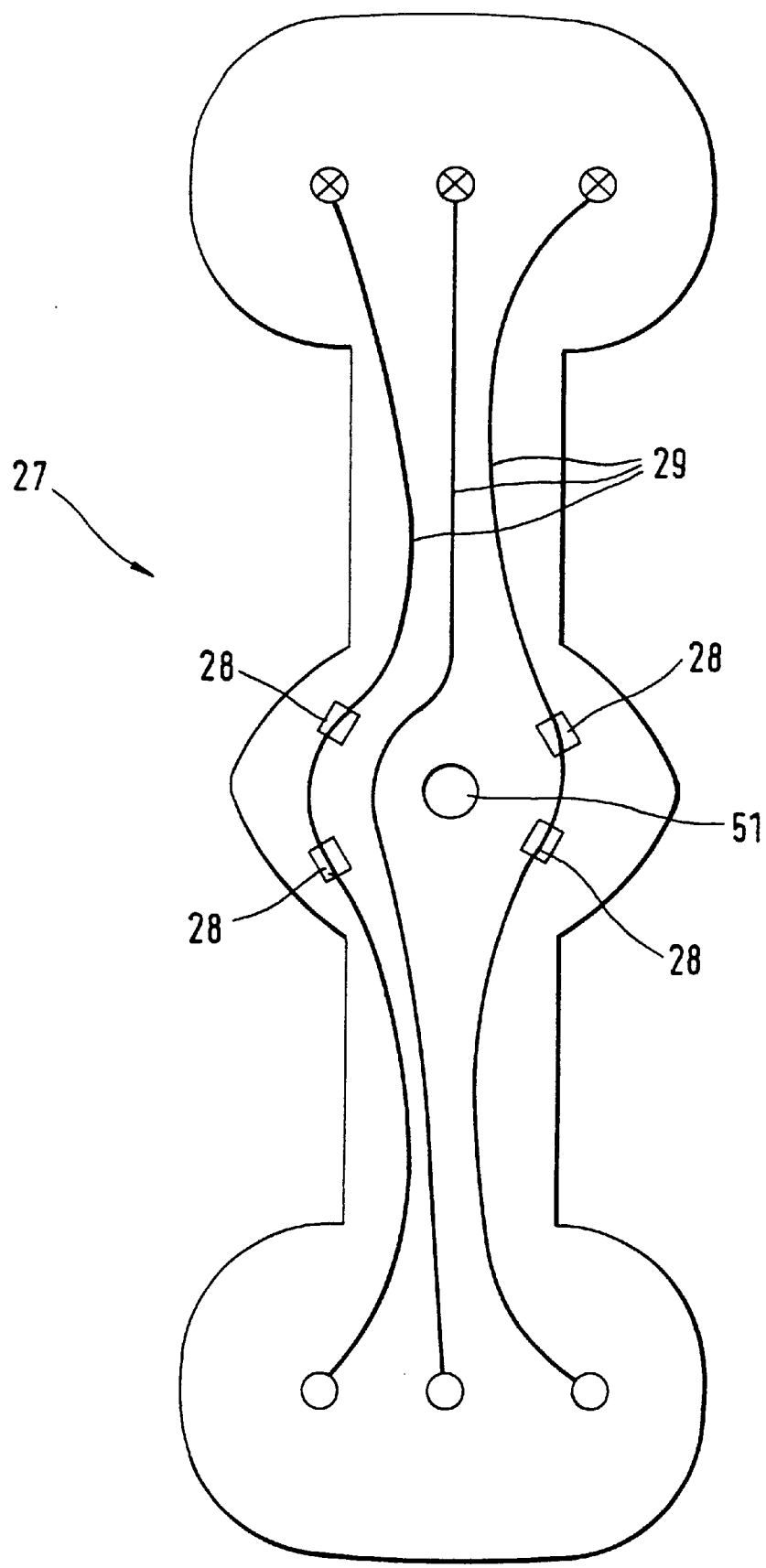
FIG. 6 shows a flexible printed circuit board.

A flexible printed circuit board 27, which has three cores 29 and is illustrated in FIG. 6, is preferably provided for electrical connection. This printed circuit board can be soldered onto the three electrodes in a single work step. By this means, the electrodes are electrically conductively connected to the cores 29 of the flexible printed circuit board 27. Since the construction in respect of transmitter 13 and receiver 15 is completely identical, incorrect mounting by confusing transmitter 13 and receiver 15 is not possible. Moreover, it is likewise not possible for an error to occur in respect of the connection of the connection electrode 21, since this electrode is unambiguously distinguished by its position between the other two electrodes.

For safety reasons, preferably both the transmitter 13 and the receiver 15 are connected to ground in each case via an element that limits both positive and negative applied voltages. These are preferably multilayer varistors which are applied on account of their small dimensions on the flexible printed circuit board 27. Surface-mountable multilayer varistors, so-called SMD components, are preferably used, which can be soldered onto the flexible printed circuit board 27 by machine by means of surface mounting.

Figure 5:
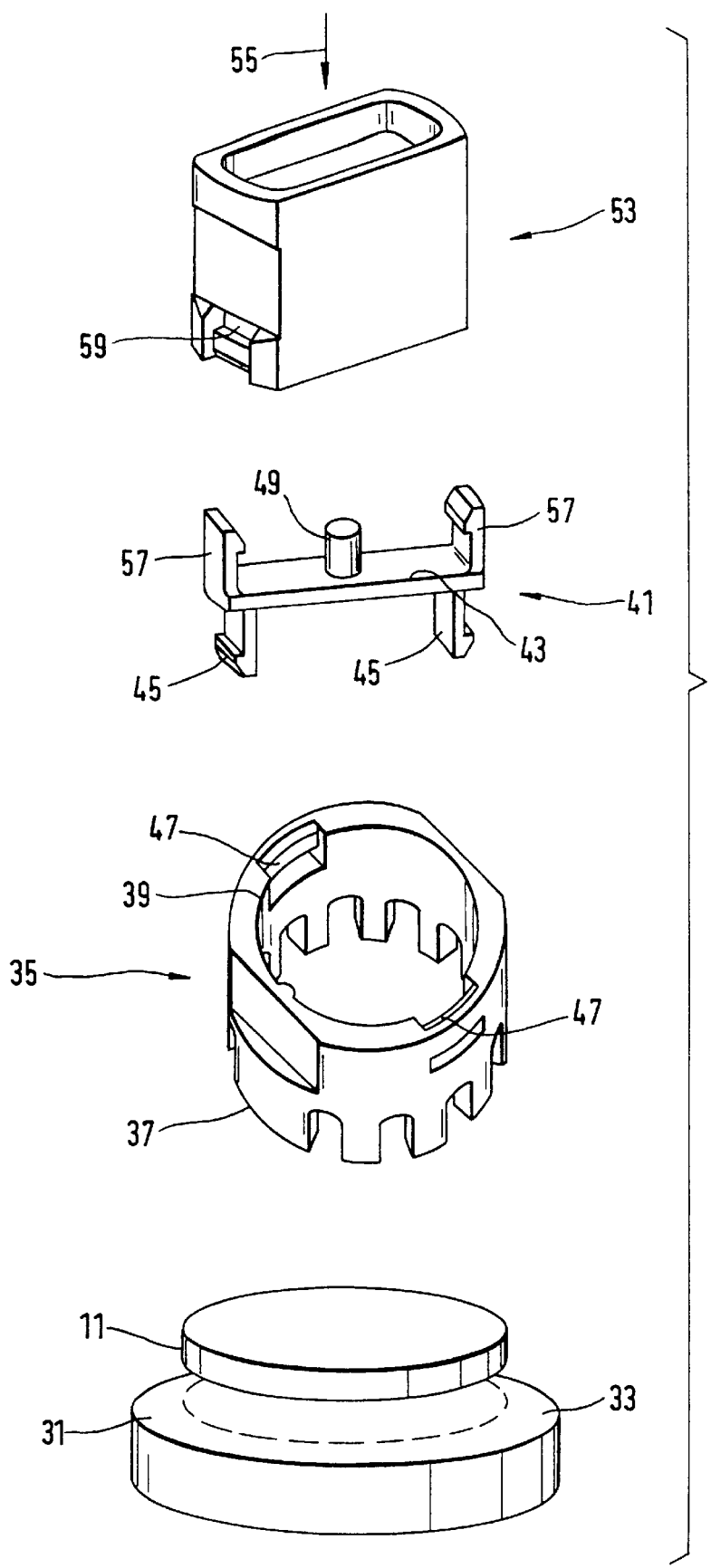
FIG. 5 shows an exploded illustration of those components of FIG. 1 which are arranged inside the housing.

In the course of producing an apparatus according to the invention, the piezoelectric element 11 is firstly bonded onto the disk 31. As illustrated in FIG. 5, the disk 31 has a somewhat larger diameter than the piezoelectric element 11. Consequently, the disk 31 has a free outer annular edge 33. In a subsequent work operation, the flexible printed circuit board 27 is connected to the transmitter 13, receiver 15 and connection electrode 21. This is preferably effected by means of a soldering operation performed by machine, in which preferably an entire batch is equipped with flexible printed circuit boards 27 and drawn through a soldering bath.

A mounting sleeve 35, which is illustrated in FIG. 5 and is essentially cylindrical, is provided. In the fitted state, the mounting sleeve 35 is arranged in the housing 1 and has a first opening 37, facing the diaphragm, and a second opening 39, facing away from the diaphragm.

In the course of production, the mounting sleeve 35 is fastened on the edge 33 of the disk 31 by an annular end face bounding the opening 37 facing the diaphragm. It is bonded on, for example. The opening 37 is thus closed off by the piezoelectric element 11. The flexible printed circuit board 27, which is not illustrated in FIG. 5, is passed through the second opening 39, facing away from the diaphragm, and arranged in the housing 1.

A fixing apparatus 41 for fixing the flexible printed circuit board 27 is provided. In the exemplary embodiment illustrated in FIG. 5, this is a carrier 43 having two snap-action hooks 45 by means of which it can be latched onto the mounting sleeve 35. The mounting sleeve 35 has two mutually diametrically opposed undercuts 47, which are arranged at the edge of the opening 39 and into which the snap-action hooks 45 engage.

A cylindrical bar 49 is integrally formed on the carrier 43, on that side thereof which is facing away from the diaphragm, and the flexible printed circuit board 27 has a circular cutout 51 in its center in the longitudinal direction. For the purpose of fixing, the flexible printed circuit board 27 is placed onto the fixing apparatus 41, in such a way that the bar 49 penetrates through the cutout 51.

A plug 53 is arranged in the housing 1 on that side of mounting sleeve 35 and fixing apparatus 41 which is faces away from the diaphragm 5. The cores 29 of the flexible printed circuit board 27 are electrically conductively connected to said plug 53. The plug 53 has plug contacts (not illustrated in FIG. 5) via which contact can be made with the cores 29 from above in the direction illustrated by an arrow 55 in FIG. 5.

Two further snap-action hooks 57 pointing in the direction away from the diaphragm are provided on the fixing apparatus 41. Corresponding undercuts 59 are arranged on that end of the plug 53 which faces the diaphragm, into which undercuts the snap-action hooks 57 latch into place when the plug 53 is placed onto the fixing apparatus 41 fastened on the mounting sleeve 35.

The following components illustrated in FIG. 5: disk 31, piezoelectric element 11, mounting sleeve 35, fixing element 41, plug 53, and the flexible printed circuit board 27 illustrated in FIG. 6 form a structural unit which can be preassembled in its entirety and can simply be introduced into the housing 1 as a finished structural unit and be fastened in said housing. The fastening is carried out by applying an adhesive to the diaphragm surface pointing into the housing interior and pressing the structural unit with the disk 31 in front onto the diaphragm 5.

The orientation of the structural unit in the housing 1 is preferably selected in this case such that an imaginary straight line running in the diaphragm plane and connecting the oscillating bars 7, 9 runs perpendicularly to the axis 17, with regard to which the electrodes are arranged symmetrically on the diaphragm 5. The effect achieved as a result of this is that an oscillation component which produces a displacement of the oscillating bars 7, 9 in a plane in which they are in their position of equilibrium in other words perpendicular to the desired displacement, practically does not occur.

The reception signal E, which is available via the receiver 15, has an amplitude A and a phase $\Delta\phi$. Phase $\Delta\phi$ in this case refers to the phase difference between the reception signal E and the transmission signal S applied to the transmitter 15.

The amplitude A is larger, the larger the mechanical oscillation amplitude of the oscillating bars 7, 9 is. To exploit this fact, the apparatus is preferably operated at its resonant frequency $f_r$. The mechanical oscillation amplitude is a maximum at the resonant frequency $f_r$.

If a harmonic oscillator is considered as an example of an ideal oscillatory system, then its oscillation amplitude has a single maximum as a function of the oscillation frequency. The phase difference between the oscillation excitation and the oscillation of the oscillator experiences a sudden phase change of 180° in the region of this maximum. At the resonant frequency, the oscillation amplitude is a maximum and the phase difference is 90°.

Based on the same fundamental physical principle, a fixed phase relationship between the transmission signal S and the reception signal E exists in the case of resonance in the present apparatus, too. The fixed value of the phase difference is dependent on the mechanical and electrical oscillation properties of the apparatus. Measurements have shown that the values generally lie between + or −60° and + or −90°. The signs result from the definition of the reference point for determining the phase angle.

In order that such an apparatus is made to oscillate close to its resonant frequency $f_r$, a feedback circuit is provided, which regulates the phase difference existing between the electrical transmission signal S and the reception signal E to a specific, constant value $\Delta\phi_R$.

In a harmonic oscillator, attenuation or reduction of the oscillation quality effects a reduction in the maximum amplitude in the case of resonance. In such a case, the phase increase as a function of the frequency proceeds continuously rather than abruptly, to be precise it proceeds all the more slowly, the greater the attenuation or the reduction of the oscillation quality is. Overall, however, even with very great attenuation, a phase change of a total of 180° ensues and a phase difference of 90° exists at the resonant frequency. The fixed value, corresponding to resonance, of the phase difference of 90° always exists and is assumed at the resonant frequency.

In contrast to an ideal oscillator, coupling of an electrical and mechanical nature between the piezoelectric element 11, the transmitter 13, the receiver 15 and the mechanical oscillatory structure exists in the abovementioned apparatus.

Mechanical coupling of the kind that might occur, for example, due to mechanical bracing is negligibly slight in the case of the apparatus described and is therefore not taken into account below.

Electrical coupling exists between the transmitter 13 and the ground electrode 19, between the transmitter 13 and the connection electrode 23, between the receiver 23 and the ground electrode 23, between the receiver 15 and the connection electrode 23 and between the transmitter 13 and the receiver 15. It can be illustrated, in the form of an equivalent circuit diagram, by the capacitances connecting the respective electrodes.

The effect of this capacitive coupling is that a signal which differs from zero is present at the receiver 15 even when the oscillating bars 7, 9 are fixedly restrained and the diaphragm 5 is not executing any mechanical movement. In this case, the electrical coupling between the transmitter 13 and the receiver 15 definitely furnishes the largest proportion.

The reception signal E present at the receiver 15 is composed of two components, namely a measurement signal $E_M$ and an additional signal $E_{el}$ governed by the electrical coupling.

$$E = E_M + E_{el}$$

The measurement signal $E_M$ is based on the oscillation of the mechanical oscillatory structure and has a frequency-dependent amplitude $A_M(f)$ and a frequency-dependent phase $\Delta\phi_M(f)$.

Figure 7A:
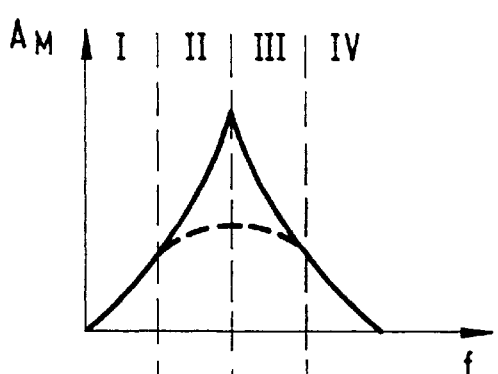
FIG. 7a shows the amplitude of a measurement signal.
Figure 7B:
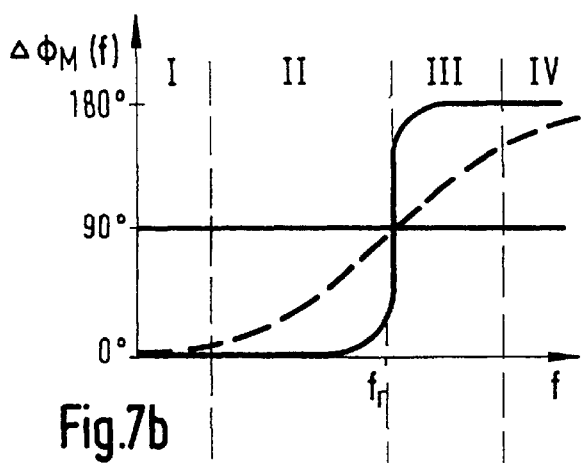
FIG. 7b shows the phase of the measurement signal.

FIG. 7a shows the amplitude $A_M(f)$ and FIG. 7b the phase $\Delta\phi_M(f)$ of the measurement signal $E_M$ as a function of the frequency f. The curves can be determined computationally by simulation calculations, for example by finite element calculations.

They can be measured experimentally by connecting the transmitter 13 to a frequency generator and by determining the phase and amplitude of the oscillation of the oscillating bars 7, 9 as a function of the frequency of the frequency generator, using a laser vibrometer, for example.

In each of the two FIGS. 7a, 7b, the continuous line corresponds to an apparatus which oscillates freely and the dashed line corresponds to an apparatus whose oscillation is greatly attenuated. In both cases, both the amplitude $A_M(f)$ and the phase $\Delta\phi_M(f)$ of the measurement signal have the profile which is typical of a harmonic oscillator and has already been described above.

The additional signal $E_{el}$ has an essentially constant amplitude $A_{el}$ and an essentially constant phase $\Delta\phi_{el}$. In this case, too, phase denotes the phase offset of the respective component of the electrical signal E with reference to the electrical transmission signal S.

Figure 8A:
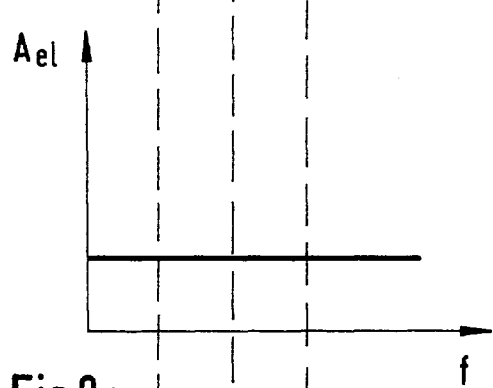
FIG. 8a shows the amplitude of an additional signal.
Figure 8B:
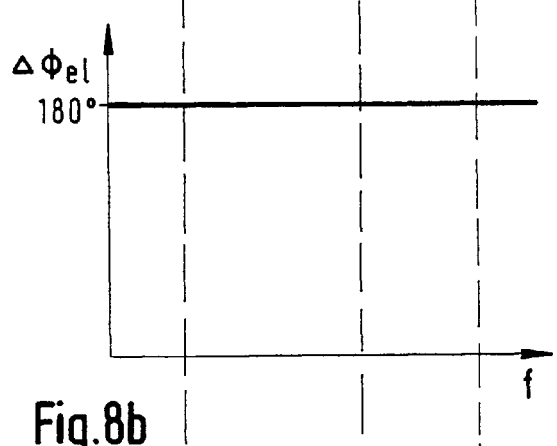
FIG. 8b shows the phase of the additional signal.

The continuous line in FIG. 8a shows the amplitude $A_{el}$ and the continuous line in FIG. 8b the phase $\Delta\phi_{el}$ of the additional signal $E_{el}$ as a function of the frequency f. These curves can also be determined by simulation calculations. They can be picked up experimentally, for example, by employing a non-polarized, piezoelectric element. In the case of the latter, no mechanical motion at all is produced by a transmission signal and the signal E consequently corresponds to the additional signal $E_{el}$ which is based on electrical coupling. The latter signal can be measured by means of an oscilloscope.

The amplitude $A_{el}$ and the phases $\Delta\phi_{el}$ of the additional signal $E_{el}$ are unambiguously related to the mechanical structure of the respective apparatus and the electrical properties thereof. In the exemplary embodiment shown, the additional signal $E_{el}$ has a phase of 180°.

Figure 9A:
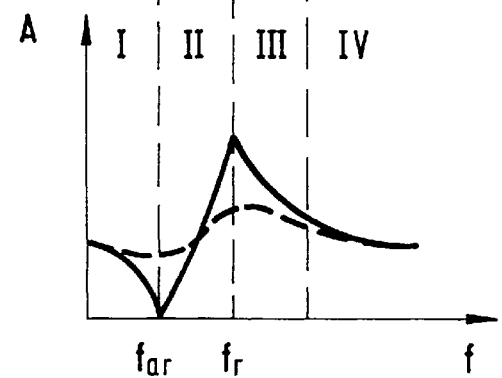
FIG. 9a shows the amplitude of a reception signal.
Figure 9B:
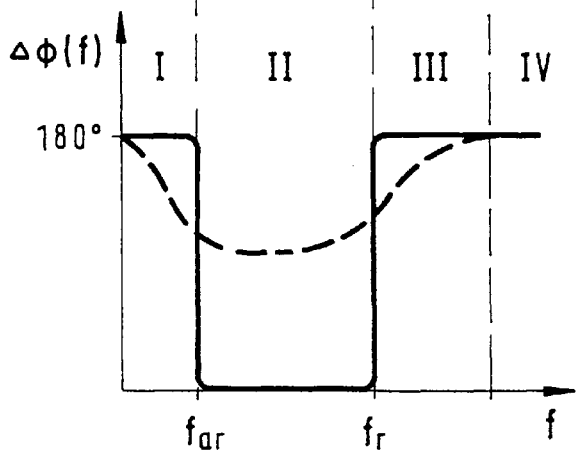
FIG. 9b shows the phase of the reception signal.

FIG. 9a shows the amplitude A(f) and FIG. 9b the phase $\Delta\phi(f)$ of the signal E. The two curves result from the phase- and amplitude-accurate superposition of the two above-described components of the signal E.

$$Ee^{i\Delta\phi}=A_M e^{i\Delta\phi_M}+A_{el}e^{i\Delta\phi_{el}}$$

Both curves each have four regions I, II, III, IV, which are described in a greatly simplified manner below.

In the outer regions I and IV, the additional signal $E_{el}$ has the larger amplitude $A_{el}$ and is consequently predominant. Consequently, the resulting phase $\Delta\phi$ essentially corresponds to the phase of the additional signal $\Delta\phi_{el}$.

In the regions I and II, the signals are in antiphase. The amplitude A decreases in the region I. It is zero at the upper region boundary. At this frequency, which is referred to as the antiresonant frequency $f_{ar}$ below, the measurement signal $E_M$ and the additional signal $E_{el}$ have the same amplitude and opposite phases. The amplitude A rises again in the region II. In the regions III and IV, the two signals are in phase and are added. The amplitude A has a maximum at the resonant frequency $f_r$ at the boundary between the regions II and III and continuously decreases toward higher frequencies.

The phase $\Delta\phi$ is 180° in the region I, 0° in the region II and 180° again in the regions III and IV.

If the situation now arises where the mechanical oscillatory structure is damped, then the amplitude $A_M(f)$ and phase $\Delta\phi_M(f)$ of the measurement signal exhibit the profile illustrated by dashed lines in FIGS. 7a and 7b. The amplitude $A_M(f)$ rises and falls considerably more slowly with the frequency and has a distinctly lower maximum value. The phase $\Delta\phi_M(f)$ does not exhibit a sudden phase change, but rather rises continuously with the frequency. The greater the damping is, the lower the maximum value of the amplitude and the lower the gradient of the phase is. However, the phase $\Delta\phi_M(f)$ always reaches the values 0° and 180° asymptotically and it is still 90° at the resonant frequency. The additional signal $E_{el}$ remains unchanged.

The amplitude A(f) and phase $\Delta\phi(f)$ of the reception signal E resulting from the amplitude- and phase-accurate superposition of the two components clearly differ from the case mentioned first, in which there was no reduction in the oscillation quality. The maxima of the amplitude A(f) are a great deal less pronounced and the phase $\Delta\phi(f)$ has two continuous phase changes in opposite directions to one another instead of the two sudden phase changes each of 180° in opposite directions to one another. The maximum phase difference is clearly less than 180°. Depending on the damping of the system, it can even be less than 90°.

If, therefore, damping of the mechanical oscillatory structure, for example in foam or in a viscous medium, or a different type of reduction in the oscillation quality of the system occurs, then the phase difference $\Delta\phi$ between the electrical transmission signal and the electrical signal E admittedly still has, as a function of the frequency, two continuous phase changes in opposite directions to one another, but the maximum phase difference may be very small. The maximum phase difference is smaller, the smaller the interval between the resonant frequency $f_r$ and the antiresonant frequency $f_{ar}$ is.

Comparable signal analyses can also be set up in apparatus other than the apparatus according to the invention as described above with reference to FIGS. 1 to 6, which apparatus have an oscillating element and an electromechanical transducer. Investigations have shown that the percentage interval between the resonant frequency and the antiresonant frequency is decisive for the range of different media in which the apparatus can be used in an entirely satisfactory manner. It has been shown here that a percentage interval of 20% or more suffices to ensure that the apparatus can be employed in practically all applications. The percentage interval denotes the absolute value of the difference between resonant frequency $f_r$ and antiresonant frequency $f_{ar}$ referring to the resonant frequency $f_r$. The same apparatus can be employed in all the abovementioned media, without changes or media-specific settings having to be implemented.

The percentage interval between the resonant frequency and the antiresonant frequency of an apparatus can be measured as described above, and an apparatus can be optimized to the effect that it has a larger percentage interval. In order to enlarge said interval, the following measures are suitable:

a) increasing the mechanical oscillation quality of the oscillating element, for example by means of shaping and choice of material;

b) reducing energy losses, for example by means of a symmetrical construction, c) avoiding energy losses which occur during the transmission of the oscillation from the transducer to the diaphragm, and vice versa;

d) reducing the number of components; and e) avoiding mechanical bracing.

The apparatus according to the invention, as illustrated in FIGS. 1 to 6, affords the advantage that the use of a single piezoelectric element 11, which either directly or with the interposition of a disk 31 made of a material which is optimally matched on account of its stiffness, means that practically no mechanical bracing occurs, which bracing would result in a reduction of the interval between the resonant frequency $f_r$ and the antiresonant frequency $f_{ar}$.

In addition, the symmetry of transmitter 13 and receiver 15 and the arrangement thereof on the homogeneously polarized piezoelectric element 11 causes the amplitude $A_{el}$ of the additional signal $E_{el}$ to be very small in comparison with the amplitude $A_M$ of the measurement signal $E_M$. The symmetrical arrangement of the connection electrode 23 between transmitter 13 and receiver 15 leads to a further reduction in the electrical coupling between the transmitter 13 and the receiver 15 and hence to a further reduction in the amplitude $A_{el}$ of the additional signal $E_{el}$.

Correspondingly, an apparatus according to the invention has a very large interval between the resonant frequency $f_r$ and the antiresonant frequency $f_{ar}$. The interval $\Delta f=(f_r-f_{ar})/f_r$ between the resonant frequency $f_r$ and the antiresonant frequency $f_{ar}$ referring to the resonant frequency $f_r$ is up to 40% in air. The maximum phase difference $\Delta\phi$ is 180° in air. When the oscillating bars 7, 9 are immersed in a viscous foam or in a highly viscous medium, the previously described situation where the maximum phase difference $\Delta\phi$ is reduced occurs on account of the properties of the charge material.

Figure 10:
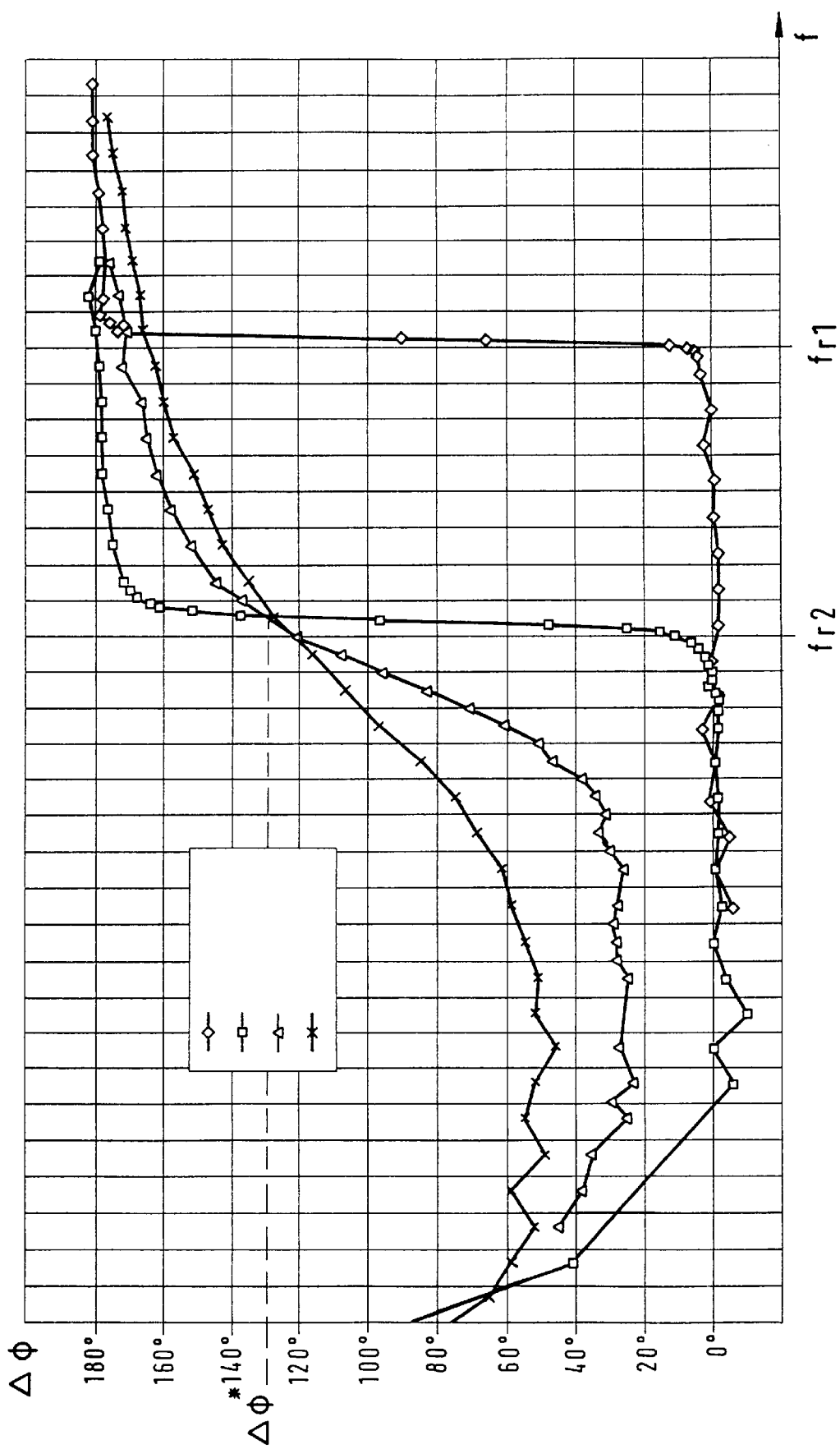
FIG. 10 shows the phase of the reception signal as a function of the frequency for oscillating bars immersed in various media.

FIG. 10 shows the profile of the phase difference $\Delta\phi$ at frequencies in the vicinity of the resonant frequency $f_r$ of this apparatus, the phase profile that is marked with rhombi resulting when the apparatus oscillates in air. The phase profile which is marked with squares results when the oscillating bars 7, 9 are immersed in water; the phase profile which is marked with triangles results when the oscillating bars 7, 9 are immersed in a liquid having a viscosity of 1000 mPas; and the phase profile which is marked with crosses results when the oscillating bars 7, 9 are immersed in a liquid having a viscosity of 5000 mPas. The resonant frequency in air is designated by $f_{rl}$ and the resonant frequency in water is designated by $f_r$.

In the unproblematic applications in air and in water, the maximum phase difference is 180°. On account of the apparatus structure according to the invention, the maximum phase difference is still approximately 160° in the liquid having a viscosity of 1000 mPas and still approximately 120° in the liquid having a viscosity of 5000 mPas. Further measurements (not illustrated in FIG. 10) in which the oscillating bars 7, 9 were immersed in foam afforded maximum phase differences of comparable magnitude or of even greater magnitude, depending on the viscosity of the foam. Thus, for example, the maximum phase difference in the case of a viscous foam has approximately the same value as that which was measured in a medium having a viscosity of 5000 mPas.

It is thus possible to specify a single sensor-specific phase difference $\Delta\phi_R$, which can be set between the transmission signal S and the reception signal E so that the apparatus operates entirely satisfactorily in a large range of media from low to high viscosity. This sensor-specific phase difference is preferably equal to the phase difference $\Delta\phi^*$, which is distinguished by the point of intersection of the phase profiles in FIG. 10. In FIG. 10, this point of intersection lies about 70° below the phase which occurs when the apparatus oscillates freely in air. The oscillation frequency in the immersed state in the various media is identical at this distinguished sensor-specific phase difference $\Delta\phi^*$.

Preferably, the phase difference $\Delta\phi$ between transmission signal S and reception signal E is held at this distinguished sensor-specific value $\Delta\phi^*$ and the frequency of the reception signal E is evaluated. If the frequency f of the reception signal E is a specific percentage proportion $(f_{rl}-f_m)/f_{rl}$ of the resonant frequency $f_{rl}$ in air less than the resonant frequency $f_{rl}$ in air, then the oscillating bars 7, 9 are covered by the charge material. This percentage interval is referred to as switching interval below.

Figure 11:
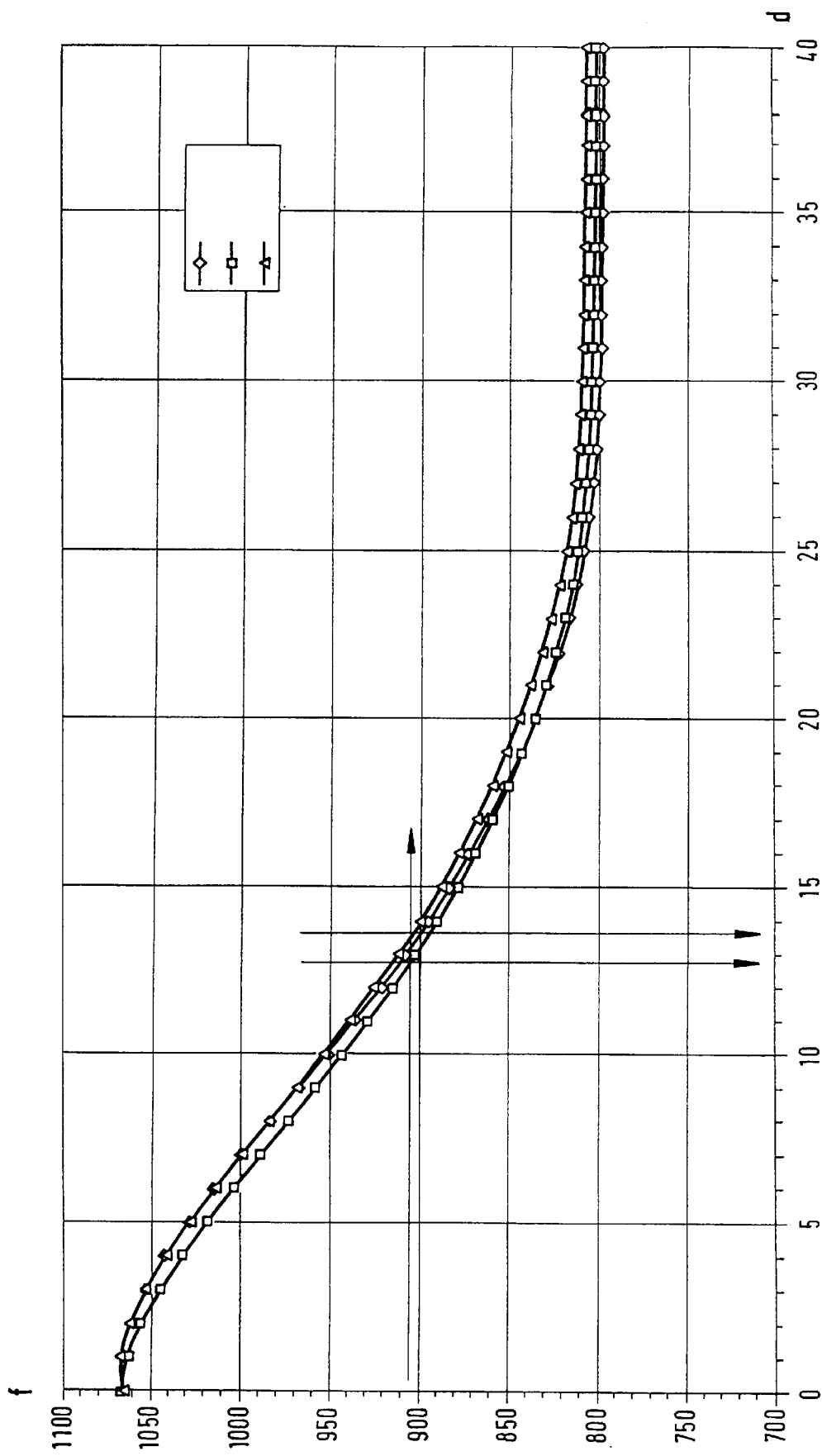
FIG. 11 shows the frequency of the reception signal as a function of the immersion depth of the oscillating bars for various media.

FIG. 11 illustrates measurements showing the frequency f of the reception signal E as a function of the immersion depth d of the oscillating bars 7, 9 in various media. The frequency f is shown in hertz and the immersion depth d in millimeters. The curve which is marked with rhombi was obtained by immersion in water; the curve which is marked with squares was obtained by immersion in a liquid having a viscosity of 5000 mPas; and the curve which is marked with triangles was obtained by immersion in a liquid having a viscosity of 12,500 mPas. The measurements show that, given a switching interval of −15%, illustrated by the horizontal dashed line, the immersion depths at which the switching interval is undershot differ only by 1 mm in the three media.

The apparatus affords practically identically good results in a very large range of media. The reason for this is the large percentage interval between the resonant frequency $f_r$ and the antiresonant frequency $f_{ar}$ referring to the resonant frequency $f_r$. This interval ensures that there is a sensor-specific phase difference which is always reached in the event of immersion in the various media. The apparatus becomes particularly accurate, insofar as it switches at a virtually identical immersion depth in the event of immersion in various media, when this sensor-specific phase difference $\Delta\phi_R$ is equal to the distinguished phase difference $\Delta\phi^*$ at which the curves of the phases of the reception signal as a function of the frequency in the case of oscillating bars 7, 9 immersed in various media intersect.

Figure 12:
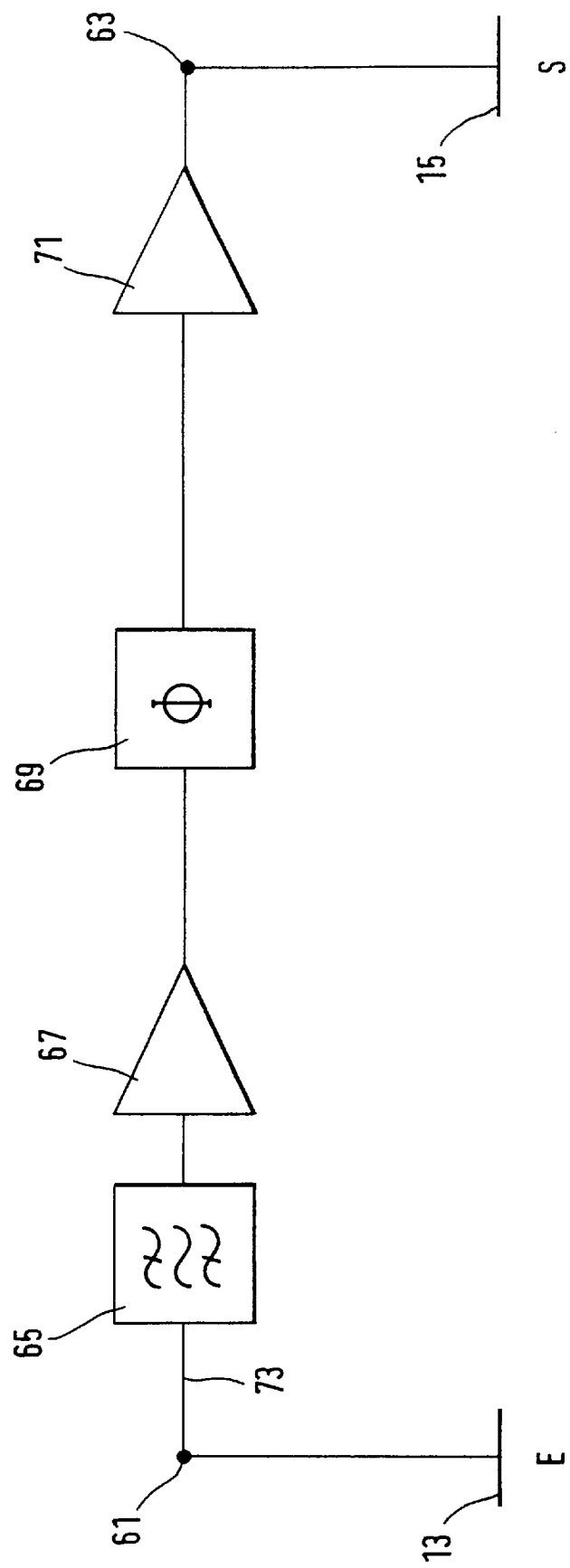
FIG. 12 shows a block diagram of a feedback circuit.

A feedback circuit (illustrated in FIG. 12) is provided which serves to cause the apparatus to oscillate and to set the sensor-specific phase difference between the transmission signal S and the reception signal E.

During operation, the reception signal E recorded by the receiver 15 is present at an input 61 of the feedback circuit and the transmission signal S is available at an output 63 of the same. The transmission signal S is equal to the reception signal E shifted by a constant, sensor-specific phase $\Delta\phi_r$ and is applied to the transmitter 15 during operation.

The feedback circuit is designed in such a way that it supplies the same constant, sensor-specific phase shift $\Delta\phi_r$ in a very wide frequency range. The frequency range is given by the frequencies which the reception signal E may have in the event of immersion in various materials when the constant, sensor-specific phase shift $\Delta\phi_r$ exists between the transmission signal S and the reception signal E. On account of the above favorable oscillation properties of the apparatus according to the invention, the range of application in which the apparatus can be employed is correspondingly large. One and the same apparatus functions entirely satisfactorily in a large range of media, starting with air through to highly viscous media and viscous foams, without changes in the setting of the apparatus being necessary. The bandwidth of the frequencies that possibly occur is correspondingly large. In the case of the measurements illustrated in FIG. 11, the frequency at which the apparatus oscillates in air was above 1000 Hz, while the frequency in the covered state was still about 800 Hz.

The feedback circuit comprises a bandpass filter 65, a first amplifier 67, which is connected in series with said filter, a phase shifter 69, which is connected in series with the first amplifier 67, and a second amplifier 71, which is connected in series with the phase shifter 69. In its entirety, the feedback circuit is dimensioned in such a way that, for a wide frequency range of reception signals E present at the input 61 of said feedback circuit, the transmission signal S which can be picked off at the output 63 of said feedback circuit is equal to the respective reception signal E shifted by the fixedly predetermined, sensor-specific phase difference $\Delta\phi_R$.

Figure 13:
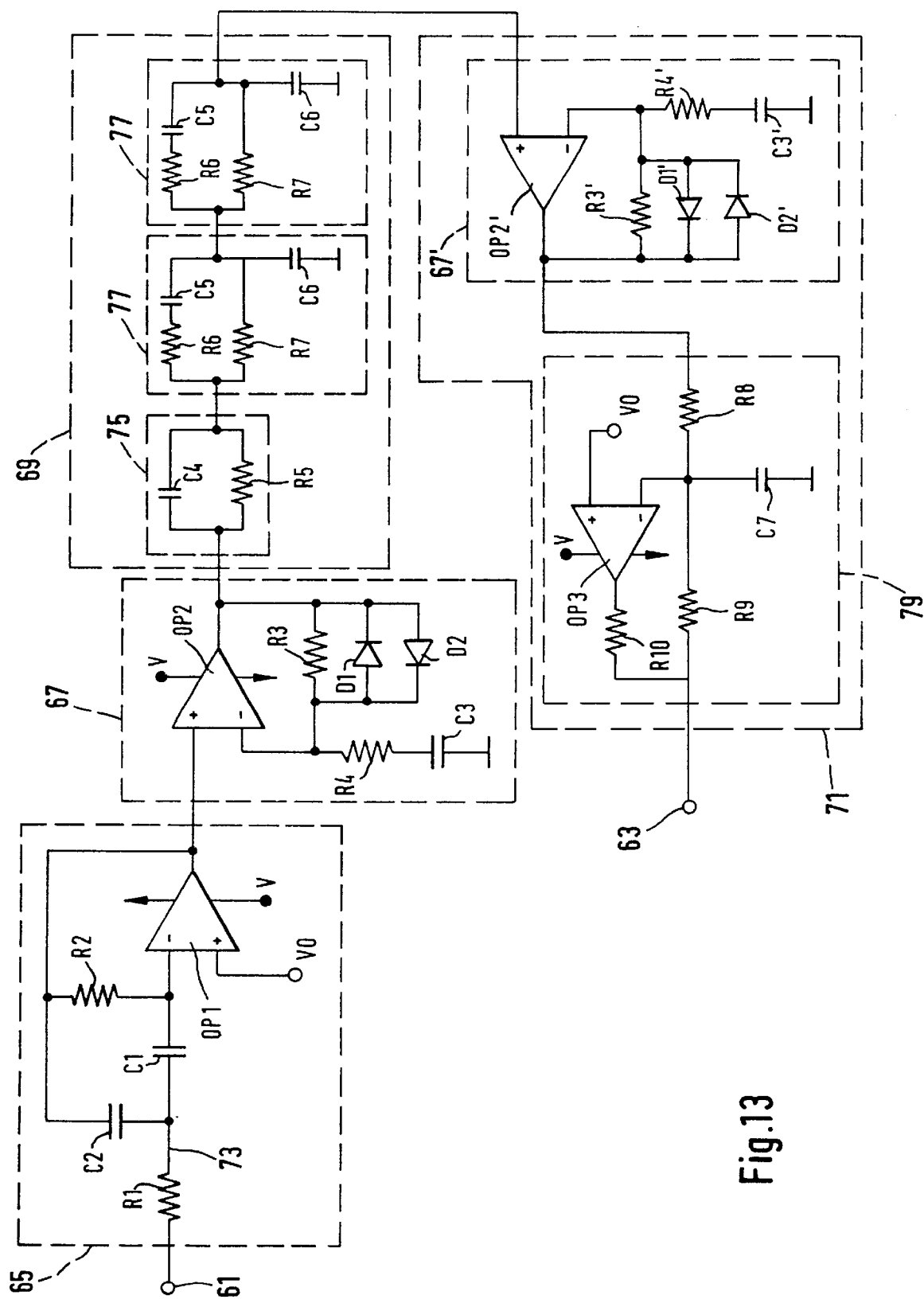
FIG. 13 shows an exemplary embodiment of the feedback circuit of FIG. 12.

FIG. 13 shows an exemplary embodiment of such a feedback circuit.

The bandpass filter 65 has a first operational amplifier OP1. The input 61 is connected to an inverting input of a first operational amplifier OP1 via a line 73 via an input resistor R1 and a first capacitor C1, which is connected in series with said resistor. The first operational amplifier OP1 is fed by a supply voltage V. A noninverting input of the first operational amplifier OP1 is connected to an offset potential VO of, for example, half the supply voltage V. In the feedback path of the first operational amplifier OP1, a second resistor R2 and a second capacitor C2 are arranged in parallel with one another, the feedback path being connected to the line 73, via the second resistor R2, between the first capacitor C1 and the inverting input of the first operational amplifier OP1 and, via the second capacitor C2, between the input resistor R1 and the first capacitor C1.

The first amplifier 67 is arranged in series with the bandpass filter 65. This amplifier is a noninverting, amplitude-limited amplifier which has a second operational amplifier OP2. The output of the first operational amplifier OP1 is connected to a noninverting input of the second operational amplifier OP2. The second operational amplifier OP2 is likewise fed via the supply voltage V. The output of the second operational amplifier OP2 is applied via a high-value third resistor R3 to an inverting input of the second operational amplifier OP2. In addition, the inverting input of the second operational amplifier OP2 is connected to ground via a fourth resistor R4 and a third capacitor C3, which is connected in series with the latter. The fourth resistor R4 and the third capacitor C3 form lower band limiting. Above a cut-off frequency given by this lower band limiting, the gain of the first amplifier 67 is essentially determined by the ratio of the third resistor R3 to the fourth resistor R4. A first and a second diode D1, D2, which are oppositely biased relative to one another, are arranged in parallel with one another in parallel with the third resistor R3. The first and the second diode D1, D2 have the effect of maintaining the waveshape of a quasi sinusoidal signal to be amplified, despite a high gain.

The phase shifter 69 is connected to the amplifier 67. The phase shifter 69 is a passive phase shifter and comprises an input coupling arrangement 75 and two series-connected, identical elements 77, which effect the actual phase shifting. The input coupling arrangement 75 comprises a fourth capacitor C4 and an extremely high-value fifth resistor R5, which is connected in parallel with the latter. The fifth resistor R5 serves to ensure that the total resistance of the phase shifter 69 is not infinite in the case of DC current. The elements 77 effecting the actual phase shifting each comprise a first path, in which a sixth resistor R6 and a fifth capacitor C5 are arranged in series, and a second path, which is connected in parallel with the first path and in which a seventh resistor R7 is arranged, the latter being connected to ground via a sixth capacitor C6.

In the exemplary embodiment illustrated, the second amplifier 71, which is arranged in series with the phase shifter 69, comprises two subcircuits 67', 79 connected in series. The first of the two subcircuits 67' is identical to the first amplifier 67 and is therefore provided with the same reference symbol, supplemented by a prime in order to distinguish it, in FIG. 13. The second subcircuit 79 has an eighth resistor R8 and a ninth resistor R9, which is connected in series with the latter. There is a tap between the eighth and ninth resistors R8, R9, which tap is connected, on the one hand, to an inverting input of a third operational amplifier OP3 and, on the other hand, to ground via a seventh capacitor C7. The offset voltage VO is applied to a noninverting input of the third operational amplifier OP3, and the third operational amplifier OP3 is fed by the supply voltage V. The ninth resistor R9 is connected directly to the output 63 of the feedback circuit, and an output of the third operational amplifier OP3 is connected to the output 63 via a tenth resistor R10.

The eighth resistor R8 and the seventh capacitor C7 form a low-pass filter, which serves to filter out interference from the ultrasonic frequency range. The gain of the subcircuit 79 is essentially determined from the ratio of the value of the ninth to the eighth resistor R8, R9.

The circuit is dimensioned in such a way that the phase shift achieved by the feedback circuit has the desired value. This is done for example by calculation of the circuit or by simulation of the circuit. In this case, it is necessary to take account of the phase shift of all the components of the circuit, in order that at the end the output signal of the feedback circuit referring to the input signal of the feedback circuit has the desired phase relationship in the frequency range.

What is claimed is:

1. An apparatus for establishing and/or monitoring a predetermined filling level in a container, which apparatus comprises:
    a housing (1),
    an oscillating element,
    a diaphragm (5), which is fixedly clamped into the housing (1) at its edge and
        to which the oscillating element is fastened, and
    an electromechanical transducer
        for exciting the diaphragm (5) to produce oscillations in dependence on a transmission signal (S) present at the transducer and
        for receiving and converting oscillations thereof into an electrical reception signal (E),
    in which a percentage interval between a resonant frequency $f_r$ and an antiresonant frequency $f_{ar}$ divided by the resonant frequency $f_r$ exceeds 20% when the oscillating element oscillates in air.

2. The apparatus as claimed in claim 1, in which
    the electromechanical transducer is a single homogeneously polarized, disk-type piezoelectric element (11), which is arranged on the diaphragm (5) and
    on which two electrodes of identical form are arranged symmetrically with respect to an axis (17) lying in a diaphragm plane,
        one of which electrodes serves as transmitter (13) and one as receiver (15).

3. The apparatus as claimed in claim 2, in which a disk (31) is arranged between the diaphragm (5) and the piezoelectric element (11) which disk is made of a material having a mechanical stiffness which is approximately equal to the stiffness of the piezoelectric element (11).

4. The apparatus as claimed in claim 3, in which a disk (31) made of steatite is arranged between the diaphragm (5) and the piezoelectric element (11).

5. The apparatus as claimed in claim 2, in which a ground electrode (19) is arranged on that side of the piezoelectric element (11) which faces the diaphragm, which ground electrode is electrically conductively connected to a connection electrode (21) arranged on the side facing away from the diaphragm, which connection electrode (21) is symmetrical with respect to the axis (17) lying in the diaphragm plane.

6. The apparatus as claimed in claim 2, in which the electrodes are electrically conductively connected to cores (29) of a flexible printed circuit board (27).

7. The apparatus as claimed in claim 6, in which multi-layer varistors (28) are arranged on the flexible printed circuit board (27), said varistors serving for voltage limiting and being soldered on by means of surface mounting.

8. The apparatus as claimed in claim 2, in which
    the oscillating element has two oscillating bars (7, 9), which are fastened in a manner spaced apart from one another on the diaphragm and are caused to oscillate, by the oscillations of the diaphragm, in opposite directions transversely with respect to their longitudinal axis, and in which a straight line running in the diaphragm plane and connecting the oscillating bars (7, 9) runs perpendicularly to the axis (17), with regard to which the electrodes are arranged symmetrically on the diaphragm (5).

9. The apparatus as claimed in claim 2, in which a mounting sleeve (35) is arranged in the housing (1), which sleeve has a first opening (37), which faces the diaphragm and
is closed off by the piezoelectric element (11), and which sleeve has a second opening (39) which faces away from the diaphragm and
through which the flexible printed circuit board (27) is passed.

10. The apparatus as claimed in claim 9, in which a fixing apparatus (41) for fixing the flexible printed circuit board (27) is provided on the mounting sleeve (35).

11. The apparatus as claimed in claim 10, in which a plug (53) is arranged on those sides of the mounting sleeve (35) and fixing apparatus (41) which are remote from the diaphragm, in the housing (1), to which plug the cores (29) of the flexible printed circuit board (27) are electrically conductively connected and which plug has plug contacts via which contact can be made with the cores (29).

12. The apparatus as claimed in claim 1, in which a feedback circuit is provided, at whose input (61), during operation, a reception signal (E) picked up by the electromechanical transducer is present, at whose output (63), during operation, a transmission signal (S) is available, which is equal to the reception signal (E) shifted by a sensor-specific phase ($\Delta\phi_R$) and
which is applied to the electromechanical transducer during operation, the sensor-specific phase shift ($\Delta\phi_R$) generated being virtually identical for input signals (E) whose frequencies lie within a frequency range, and the frequency range being given by the frequencies of the apparatus when immersed in various media.

13. The apparatus as claimed in claim 12, in which the sensor-specific phase shift is equal to a phase difference at which curves recorded with the apparatus intersect, which curves show the profile of a phase difference between the transmission signal (S) and the reception signal (E) as a function of the frequency of the transmission signal (S) for oscillating elements immersed in various media.

14. The apparatus as claimed in claim 6, in which a mounting sleeve (35) is arranged in the housing (1), which sleeve has a first opening (37), which faces the diaphragm and
is closed off by the piezoelectric element (11), and which sleeve has a second opening (39) which faces away from the diaphragm and
through which the flexible printed circuit board (27) is passed.

* * * * *